Oct. 12, 1926.
O. J. APPEL
1,603,252
HEADLIGHT MOUNTING
Filed March 16, 1926
Fig. 1,
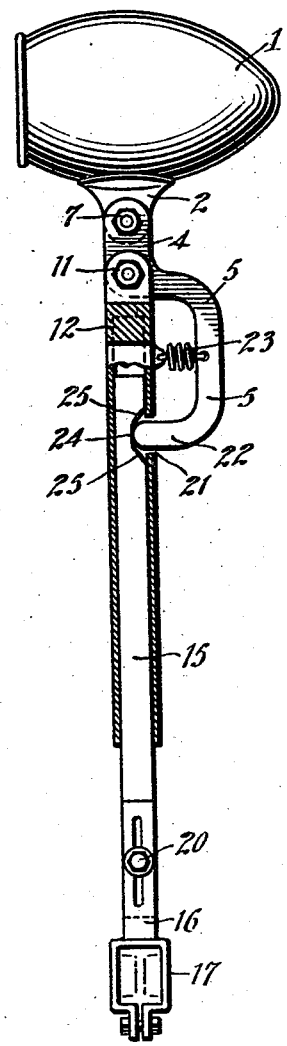
Fig. 2.
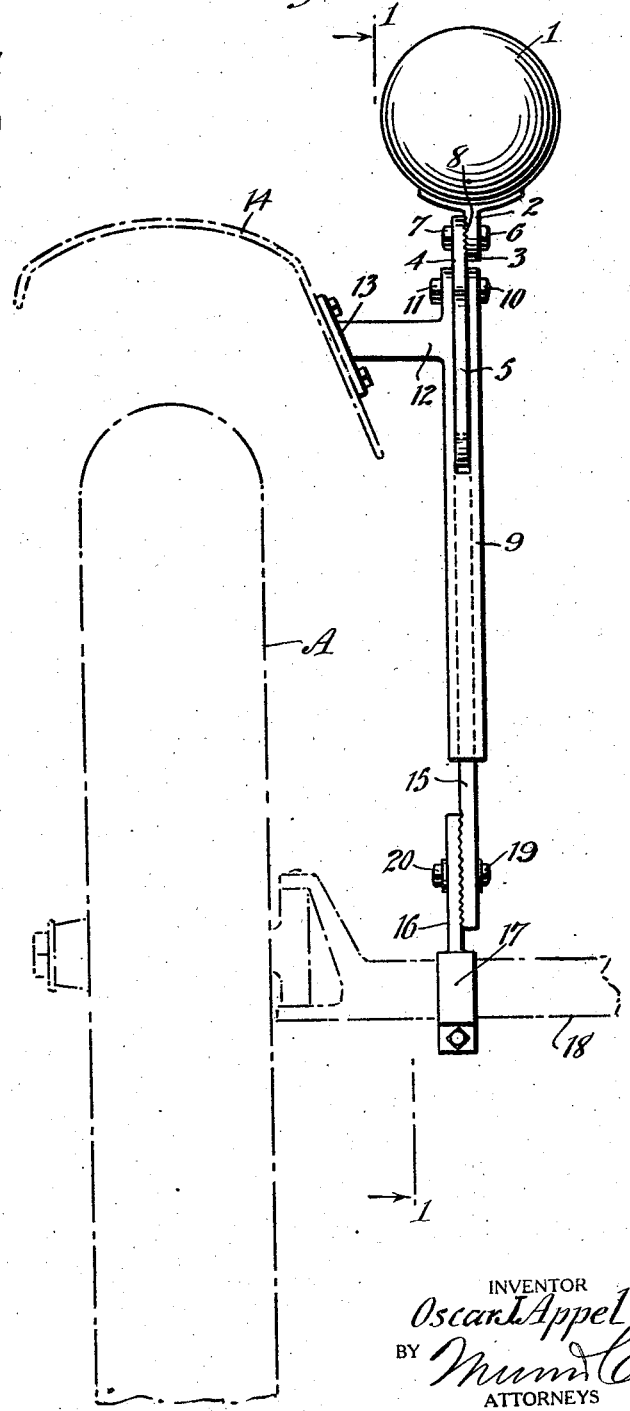
WITNESSES
Edw. Thorpe
S. W. Foster
INVENTOR
Oscar J. Appel
BY Munn & Co.
ATTORNEYS Patented Oct. 12, 1926.

1,603,252

UNITED STATES PATENT OFFICE.

OSCAR J. APPEL, OF PATERSON, NEW JERSEY.

HEADLIGHT MOUNTING.

Application filed March 16, 1926. Serial No. 95,105.

This invention relates to headlight mountings, an object of the invention being to so mount the headlight as to cause the same to tilt automatically when the wheels of the automobile supporting the same strike an obstruction or bump in the road. It is of course to be understood that the incline of the headlights will be downwardly so as to prevent the light from being thrown upwardly into the face of the driver of an approaching automobile.

With headlights as ordinarily mounted, when the wheels of the car strike an obstruction, the light is thrown upwardly due to the tilt of the headlights, and the driver of an approaching automobile receives the direct glare of the lamps. Headlights mounted in accordance with my invention will tilt downwardly when the wheels strike an obstruction in the road and prevent this uncomfortable and dangerous result above indicated.

With these and other objects in view, the invention consists in certain novel features of construction and combinations and arrangements of parts, which will be more fully hereinafter described and pointed out in the claims.

In the accompanying drawings—

Figure 1 is a view, partly in elevation and partly in longitudinal section, illustrating the mounting of one of my improved headlights;

Figure 2 is a view in elevation, showing the position of the headlight and its mounting with relation to the axle, fender and wheel of an automobile.

It is to be understood of course that my invention will be applied to both headlights of an automobile, but as the constructions of the two are precisely alike I have illustrated and shall describe but one with the understanding that this illustration and description will apply alike to both.

1 represents a headlight, which may of course be of any desired construction. A bracket 2 is fixed to the lower portion of the headlight and has a perforated circular lug 3 thereon which is secured to the upper shorter arm 4 of a bell crank lever 5 by means of a bolt 6 and nut 7. The opposed faces of this lug 3 and arm 4 are toothed or serrated, as indicated at 8, so that they are firmly locked together but are capable of adjustment to give the desired angular disposition to the headlight relative to the lever 5 supporting the same. This lever 5 is pivotally mounted at its angle in the bifurcated upper end of a sleeve 9, a bolt 10 being projected through the bifurcated upper end of the sleeve 9 and through the angle of the lever 5 and secured in place by a nut 11, although other pivotal means may be employed if desired.

This sleeve 9 is preferably formed with a bracket arm 12 which has a plate 13 at its free end adapted to be fixed to the fender 14 of an automobile.

15 represents a bar which is slidably mounted in the sleeve 9 and which is adjustably connected to a post 16, the latter having a clamp 17 at its lower end adapted to be fixed to the axle 18 of the automobile. This post 16 and bar 15 are adjustably connected vertically by a bolt 19 and nut 20, the engaging faces of said parts being preferably serrated to insure a fixed relation after adjustment.

The sleeve 9 has an opening 21 therein through which a finger 22 on lever 5 projects, and a spring 23 connects the lever with the sleeve 9, tending to force this finger through the opening 21 into a recess 24 in bar 15. The sides of this recess 24 are beveled, forming cams 25 to move the lever, as will now be explained.

The operation of my improved device is as follows:

When the wheel, indicated at A, strikes a bump or irregularity on the road the axle 8 will move vertically and will cause the bar 15 to move vertically in the sleeve 9. This movement of the bar 15, due to either of the cam faces 25, will cause the lever 5 to by swung on its pivot and tilt the forward end of the headlight downwardly, thus preventing the light from being thrown upwardly into the face of an approaching driver.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:—

1. A headlight mounting, including a sleeve adapted to be fixed to a portion of an automobile, a bar movable in the sleeve and adapted to be fixed to the axle of the automobile, a lever supporting a headlight, and a cam on said bar adapted to engage the lever and tilt the headlight when the bar is moved in the sleeve.

2. A mounting for headlights, including a sleeve, an arm on the sleeve adapted to be fixed to the fender of the automobile, a bar slidably mounted in the sleeve, a post fixed to the axle of the automobile and adjustably secured to the bar, a bell crank lever pivotally connected to the upper end of the sleeve, a headlight adjustably connected to the lever, said sleeve having an opening therein and said bar having cam faces thereon adjacent the opening, and a finger on the lever projected through the opening in the sleeve and adapted to be engaged by the cam faces when the bar is moved vertically.

3. A mounting for headlights, including a sleeve, an arm on the sleeve adapted to be fixed to the fender of the automobile, a bar slidably mounted in the sleeve, a post fixed to the axle of the automobile and adjustably secured to the bar, a bell crank lever pivotally connected to the upper end of the sleeve, a headlight adjustably connected to the lever, said sleeve having an opening therein and said bar having cam faces thereon adjacent the opening, a finger on the lever projected through the opening in the sleeve and adapted to be engaged by the cam faces when the bar is moved vertically, and a spring connecting the lever and the sleeve and holding the finger in engagement with the bar.

4. A headlight support, including a pivotally mounted bell crank lever, a headlight bracket pivotally and adjustably secured to one end of the lever, a support for the lever, a vertically movable bar having cam faces thereon and adapted to cause the lever to pivot when the bar is moved vertically, means connecting said bar with the axle of the automobile, and means connecting the lever support with the fender of the automobile.

OSCAR J. APPEL.